March 24, 1925.  W. C. HUNT  1,530,944
CONNECTER FOR ELECTRIC CONDUCTORS
Filed June 20, 1923

INVENTOR.
W. C. Hunt,
BY J. Edward Mayba
ATTY.

UNITED STATES PATENT OFFICE.

WILLIAM C. HUNT, OF TORONTO, ONTARIO, CANADA.

CONNECTER FOR ELECTRIC CONDUCTORS.

Application filed June 20, 1923. Serial No. 646,529.

*To all whom it may concern:*

Be it known that I, WILLIAM C. HUNT, of the city of Toronto, in the county of York, Province of Ontario, Canada, a subject of the King of Great Britain, have invented certain new and useful Improvements in Connecters for Electric Conductors, of which the following is a specification.

This invention relates to devices used for connecting electric conductors to take the place of soldering and other permanent connections, and my object is to devise means for this purpose in which the ends of the conductors may be quickly and easily placed in position without danger of damaging the connecter, the conductors or the hands, in which connecters will be securely held, which will be thoroughly insulated, and which will comprise a minimum number of parts and which will therefore be simple and cheap to manufacture.

I attain my object by means of the constructions hereinafter described and illustrated in the accompanying drawings in which—

Figure 1:
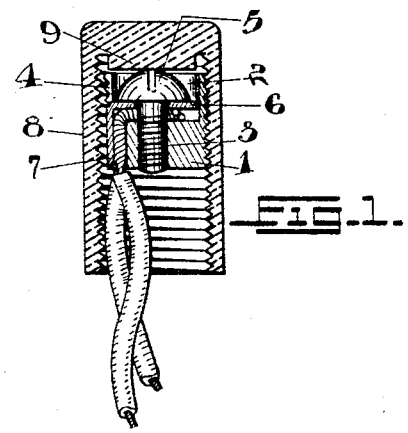
Figure 2:
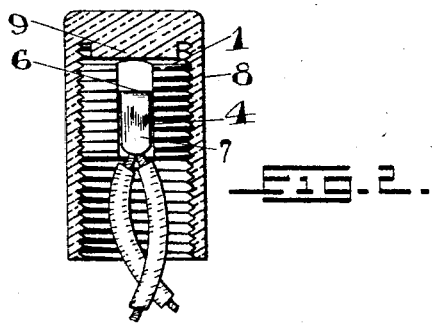
Figure 3:
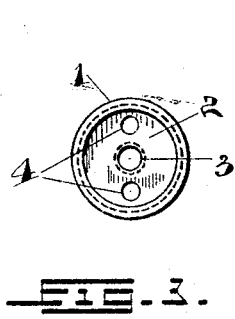

Fig. 1 is a sectional view showing my improved connecter;

Fig. 2 a side elevation of the connecter, the insulating cap being shown in section;

Fig. 3 a plan view showing a modification of the body of the connecter; and

Figure 4:
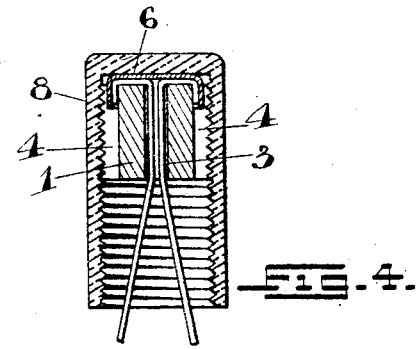

Fig. 4 a sectional view showing a further modification of the connecter.

1 is the body of the connecter, in one end of which is formed the recess 2 and through the other end a threaded hole 3 communicating with the bottom of the recess 2.

Communicating with the recess 2 is a passage 4. This passage may be a hole formed to one side of the hole 3, although I prefer to form it as a groove in the side of the body 1. Through this passage 4 the conductors are led into the recess 2 where they are bent around the bottom of the recess around the hole 3. Threaded into the hole 3 is the clamping screw 5, the head of which may directly engage and clamp the conductors against the bottom of the recess. I prefer, however, to insert between the conductors and the head of the screw a washer 6.

This washer 6 is provided at one side with a tongue 7, which tongue is bent down to retain the conductors in the groove 4. It also prevents the washer rotating while the screw 5 is being placed in position or removed.

The exterior of the body is threaded and over the body is screwed the insulating cap 8. As there is danger of the recessed end of the body member working into the cap and jamming when the top of the interior of the cap is reached, I form on the cap the projection 9. This projection is of such a length that it reaches the head 5 of the screw before the top of the cap is reached by the end of the body, and the danger of jamming is thus avoided.

It will be evident, of course, that various changes might be made in the construction of my connecter without departing from the spirit of my invention. For example, more than one passage 4 is shown in Fig. 3, may be provided if it is desired to lead the conductors in through separate passages, or if more than two conductors are to be connected.

In Fig. 4 a further modification is shown. In this construction the clamping screw 5 is dispensed with and the cap 8 is depended upon to clamp the washer against the end of the body to maintain a tight connection. The conductors are led in through the central hole 3, which in this case need not be threaded, and bent over the end of the body and down into the grooves 4. The washer 6, or in this case it might be a plain disk, is provided with a tongue at each side, which tongues retain the ends of the conductors in the grooves and thus prevent the ends of the conductors engaging the thread on the cap 8 and thus interfering in any way with the positioning or removing of the same.

From the above description it will be seen that I have devised a connecter which will satisfactorily attain the object of my invention as set out in the preamble of this specification.

What I claim as my invention is:—

1. In a connecter for electrical conductors, the combination of a body member having a hole formed in the end thereof, and a groove formed in the side of the body member through which a conductor may be led; a clamping screw in said hole; a washer on said screw adapted under the action of the screw to clamp a conductor against the end of the body member; and a tongue on the washer extending into said groove and adapted to retain the connecter in the groove and prevent rotation of the washer.

2. In a connecter for electrical conductors the combination of a threaded cylindrical body member having a recess in the end thereof, a hole formed in the bottom of said recess, and a passage through which a conductor may be led into the bottom of the recess; a clamping screw having its head in the recess and extending into said hole; and an insulating cap adapted to be threaded on and receive within it the whole of said body member.

3. In a connecter for electrical conductors the combination of a threaded cylindrical body member having a recess in the end thereof, a hole formed in the bottom of said recess, and a groove formed in the side of the body member through which a conductor may be led into the bottom of the recess; a clamping screw having its head in the recess and extending into said hole; a washer in said recess below the head of the screw, the conductor being adapted to be clamped between the washer and the bottom of the recess; a tongue on the washer extending into said groove and adapted to retain the connecter in the groove and prevent rotation of the washer; and an insulating cap adapted to be threaded on and receive within it the whole of said body member.

4. In a connecter for electrical conductors, the combination of a threaded cylindrical body member having a recess in the end thereof, a hole formed in the bottom of said recess, and a passage through which a conductor may be led into the bottom of the recess; a clamping screw having its head in the recess and extending into said hole; and an insulating cap adapted to be threaded on and receive within it the whole of said body member, the bottom of the cap extending considerably beyond the bottom of the body member.

5. In a connecter for electrical conductors, the combination of a threaded body member having a recess in the end thereof, a hole formed in the bottom of said recess, and a passage through which a conductor may be led into the bottom of the recess; a clamping screw having its head in the recess and extending into said hole; an insulating cap adapted to be threaded on and receive within it the whole of said body member; and a projection on the under side of the head of the cap with which the head of the screw may engage to hold the body member in spaced relationship to the remainder of the underside of the head of the cap.

6. In a connecter for electrical conductors, the combination of a threaded cylindrical body member having a recess in the end thereof, a hole formed in the bottom of said recess, and a groove formed in the side of the body member through which a conductor may be led into the bottom of the recess; a clamping screw having its head in the recess and extending into said hole; a washer in said recess below the head of the screw, the conductor being adapted to be clamped between the washer and the bottom of the recess; a tongue on the washer extending into said groove and adapted to retain the connecter in the groove and prevent rotation of the washer; an insulating cap adapted to be threaded on and receive within it the whole of said body member; and a projection on the under side of the head of the cap with which the head of the screw may engage to hold the body member in spaced relationship to the remainder of the underside of the head of the cap.

7. In a connecter for electrical conductors, the combination of a body member having a passage formed longitudinally thereof through which a conductor may be led and a groove in the side thereof into which the end of the conductor may be inserted; a clamping member adapted to clamp the conductor against the end of the body member; and a plate between the end of the body member and the clamping member; and a tongue on said plate extending into said groove and adapted to retain the end of the conductor in the groove and also prevent rotation of the plate.

Signed at Toronto, Canada, this 8th day of June, 1923.

WILLIAM C. HUNT.